(12) United States Patent
Yang et al.

(10) Patent No.: US 11,576,237 B2
(45) Date of Patent: Feb. 7, 2023

(54) LIGHTING APPARATUS

(71) Applicant: LEEDARSON LIGHTING CO.,LTD., Fujian (CN)

(72) Inventors: Shixue Yang, Fujian (CN); Junjie Guo, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 17/589,622

(22) Filed: Jan. 31, 2022

(65) Prior Publication Data
US 2022/0248511 A1 Aug. 4, 2022

(30) Foreign Application Priority Data
Jan. 29, 2021 (CN) .......................... 202110128877.9

(51) Int. Cl.
*H05B 45/14* (2020.01)
*H05B 45/34* (2020.01)
*H05B 45/345* (2020.01)
*H05B 45/375* (2020.01)

(52) U.S. Cl.
CPC ............ *H05B 45/14* (2020.01); *H05B 45/34* (2020.01); *H05B 45/345* (2020.01); *H05B 45/375* (2020.01)

(58) Field of Classification Search
CPC ...... H05B 45/14; H05B 45/34; H05B 45/345; H05B 45/37–385
See application file for complete search history.

(56) References Cited

U.S. PATENT DOCUMENTS

| 2011/0227489 | A1* | 9/2011 | Huynh | H05B 45/48 315/185 R |
| 2012/0217887 | A1* | 8/2012 | Kang | H05B 45/3725 315/193 |
| 2015/0029768 | A1* | 1/2015 | Morrish | H05B 45/395 363/84 |
| 2022/0109366 | A1* | 4/2022 | Maejima | H05B 45/382 |

FOREIGN PATENT DOCUMENTS

| CN | 103329618 A | * | 9/2013 | ........ H02M 3/33507 |
| CN | 105101551 B | * | 12/2017 | ......... H05B 33/0815 |
| CN | 111756240 A | * | 10/2020 | ........... G11C 27/026 |

* cited by examiner

*Primary Examiner* — Abdullah A Riyami
*Assistant Examiner* — Syed M Kaiser
(74) *Attorney, Agent, or Firm* — Chun-Ming Shih; Lanway IPR Services

(57) ABSTRACT

A lighting apparatus includes a light source, a driver circuit, a high side control module and a low side control module. The light source includes a LED module. The driver circuit includes a high side circuit and a low side circuit for generating a driving current to the LED module. The high side control module for controls the high side circuit. The high side control module includes a voltage stabilizer and a current trigger. The voltage stabilizer is placed on a voltage input of a high side. The current trigger is connected to an output of the voltage stabilizer. The low side control module controls the low side circuit. The low side control module includes a buck converter, a constant current trigger, and a low side constant current source. The buck converter is connected to a second input of the current trigger.

20 Claims, 6 Drawing Sheets

LIGHTING APPARATUS

FIELD

The present invention is related to a lighting apparatus, and more particularly related to a lighting apparatus with a stable light output a lighting apparatus.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to provide a stable driver circuit for LED devices. In driver circuit design, there are high side circuits and low side circuits. For low side circuits, they are connected to ground. For high side circuits, their control is connected to a floating ground. Therefore, high side circuits need turn-on and turn-off control signals to be correctly operated.

Therefore, it is beneficial to design a light device that can handle such variance correctly.

SUMMARY

In some embodiments, a lighting apparatus includes a light source, a driver circuit, a high side control module and a low side control module.

The light source includes a LED module.

The driver circuit includes a high side circuit and a low side circuit for generating a driving current to the LED module.

The high side control module for controls the high side circuit.

The high side control module includes a voltage stabilizer and a current trigger.

The voltage stabilizer is placed on a voltage input of a high side.

The current trigger is connected to an output of the voltage stabilizer.

The low side control module controls the low side circuit.

The low side control module includes a buck converter, a constant current trigger, and a low side constant current source.

The buck converter is connected to a second input of the current trigger.

The low side constant current source is series connected between the buck converter and a ground.

An input of the low side constant current source is connected to the voltage stabilizer.

An output of the low side constant current source is connected to the ground

A reference voltage source of the current trigger and an input of the low side constant current source are both connected to a floating ground so that a reference voltage is changed when the floating ground is changed.

The constant current trigger changes a comparing voltage by generating a pulling current to the current trigger when the constant current trigger receives a first control signal.

The current trigger outputs a second control signal when the current trigger determines the comparing voltage changes with respect to the reference voltage.

In some embodiments, the voltage stabilizer includes a voltage statblzier device connected to the input of high side voltage and a capacitor connected to an output of the voltage stablizer device.

In some embodiments, the voltage stablizer device is a linear voltage stabilizer.

In some embodiments, the voltage stabilizer device is a switch voltage stabilizer.

In some embodiments, the current trigger includes a comparator, a first current source and a loading unit.

An input of the first current source is connected to the voltage stabilizer.

An output of first current source is connected to the comparator.

The loading unit is series connected between the first current source and the buck converter.

A first end of the comparator is connected between an output of the first current source and an input of the loading unit.

A second input of the comparator is connected to the reference voltage source.

An end of the reference voltage source is connected to the floating ground to change the reference voltage when the floating ground is changed.

In some embodiments, the constant current trigger includes a switch controller to turn on or to turn off according to the first control signal.

The constant current trigger includes a second current source series connected to the switch controller.

A passing current of the second current source is larger than a passing current of the first current source.

In some embodiments, when the switch controller is turned on, a node voltage of the first end of the comparator is changed by the first current source and the second current source.

In some embodiments, the node voltage is changed to switch the output of the comparator to output the second control signal.

In some embodiments, the buck converter includes at least one transistor switch placed between the current trigger and the constant current trigger.

In some embodiments, the low side circuit is driven with the ground.

In some embodiments, the high side circuit needs a voltage raising to drive the high side circuit.

In some embodiments, a voltage of the low side circuit is transmitted to the high side circuit to control the high side circuit.

In some embodiments, an antenna is connected to the high side circuit.

In some embodiments, a wireless signal of the antenna is filtered with a filter.

In some embodiments, the wireless signal is descrambled before sent to the filter.

In some embodiments, the wireless signal is descrambled using a learning model.

In some embodiments, the learning model is a non-linear model.

In some embodiments, an error correction is performed in the learning model.

In some embodiments, the error correction is adjusted according to the reference voltage.

In some embodiments, if the descrambled result is lower than a threshold, the wireless signal is filtered directly.

DETAILED DESCRIPTION

Figure 5:
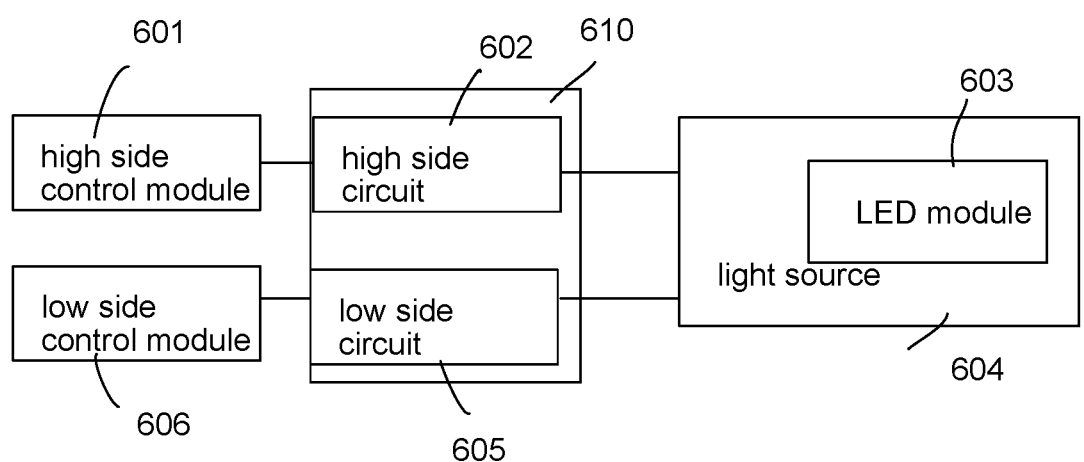
FIG. 5 illustrates a lighting apparatus embodiment.

In FIG. 5, a lighting apparatus includes a light source 604, a driver circuit 610 that includes a high side circuit 602 and a low side circuit 605, a high side control module 601 and a low side control module 606.

The light source 604 includes a LED module 603.

The driver circuit 610 includes a high side circuit 602 and a low side circuit 605 for generating a driving current to the LED module 603.

The high side control module 601 is used for controls the high side circuit 602.

The high side control module includes a voltage stabilizer and a current trigger.

The voltage stabilizer is placed on a voltage input of a high side.

The current trigger is connected to an output of the voltage stabilizer.

The low side control module 606 controls the low side circuit 605.

The low side control module includes a buck converter, a constant current trigger, and a low side constant current source.

The buck converter is connected to a second input of the current trigger.

The low side constant current source is series connected between the buck converter and a ground.

An input of the low side constant current source is connected to the voltage stabilizer.

An output of the low side constant current source is connected to the ground

A reference voltage source of the current trigger and an input of the low side constant current source are both connected to a floating ground so that a reference voltage is changed when the floating ground is changed.

The constant current trigger changes a comparing voltage by generating a pulling current to the current trigger when the constant current trigger receives a first control signal.

The current trigger outputs a second control signal when the current trigger determines the comparing voltage changes with respect to the reference voltage.

In some embodiments, the voltage stabilizer includes a voltage statblzier device connected to the input of high side voltage and a capacitor connected to an output of the voltage stablizer device.

In some embodiments, the voltage stablizer device is a linear voltage stabilizer.

In some embodiments, the voltage stabilizer device is a switch voltage stabilizer.

In some embodiments, the current trigger includes a comparator, a first current source and a loading unit.

An input of the first current source is connected to the voltage stabilizer.

An output of first current source is connected to the comparator.

The loading unit is series connected between the first current source and the buck converter.

A first end of the comparator is connected between an output of the first current source and an input of the loading unit.

A second input of the comparator is connected to the reference voltage source.

An end of the reference voltage source is connected to the floating ground to change the reference voltage when the floating ground is changed.

In some embodiments, the constant current trigger includes a switch controller to turn on or to turn off according to the first control signal.

The constant current trigger includes a second current source series connected to the switch controller.

A passing current of the second current source is larger than a passing current of the first current source.

In some embodiments, when the switch controller is turned on, a node voltage of the first end of the comparator is changed by the first current source and the second current source.

In some embodiments, the node voltage is changed to switch the output of the comparator to output the second control signal.

In some embodiments, the buck converter includes at least one transistor switch placed between the current trigger and the constant current trigger.

In some embodiments, the low side circuit is driven with the ground.

In some embodiments, the high side circuit needs a voltage raising to drive the high side circuit.

In some embodiments, a voltage of the low side circuit is transmitted to the high side circuit to control the high side circuit.

In some embodiments, an antenna is connected to the high side circuit.

Figure 6:
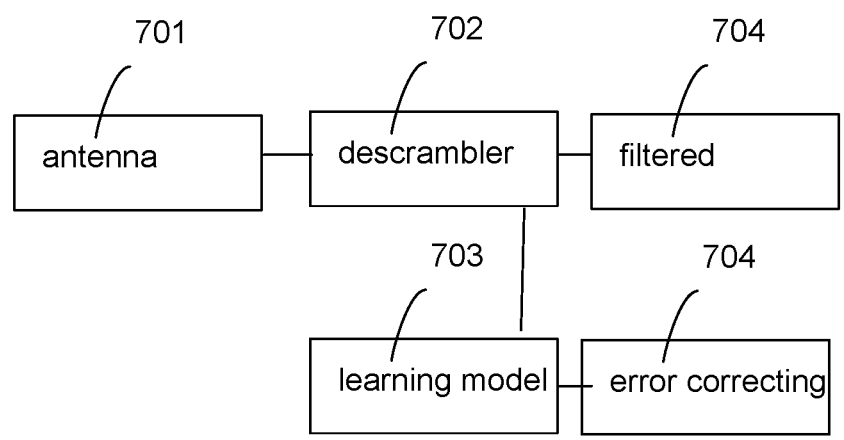
FIG. 6 illustrates a filter and descrambler structure.

In FIG. 6, a wireless signal of the antenna 701 is filtered with a filter 704. The filter 704 is used for adjusting a wireless signal wave form to enhance signal quality while ensuring signal security.

In some embodiments, the wireless signal is descrambled with a descrambler 702 before sent to the filter 704. This is based on a Lino-Opcir model for handling security signal.

In some embodiments, the wireless signal is descrambled using a learning model 703. The learning model 703 is based on a deep learning on signal data collected during a testing environment.

In some embodiments, the learning model is a non-linear model, like a Bizolr Zhonswolf model.

In some embodiments, an error correction 704 is performed in the learning model.

In some embodiments, the error correction is adjusted according to the reference voltage.

In some embodiments, if the descrambled result is lower than a threshold, the wireless signal is filtered directly.

Next, several circuit examples are provided to more clearly explaining the invention concept.

One of the basic purpose of a driver circuit is to turn on or to turn off some electronic components according to commands like wireless commands or settings.

For some electronic components, a turn-on command is sufficient when such circuits are connected to ground. For some other electronic components, both a turn-on and a turn-off command are needed. Usually, low side circuit refer to circuits with MOSFET being grounded. The driving signal is based on the ground. There is no need to raise a voltage to turn on such component.

High side circuit refers to circuits that needs to be supplied with a floating driving signal. Voltages needs to raised to control such circuits.

Figure 1:
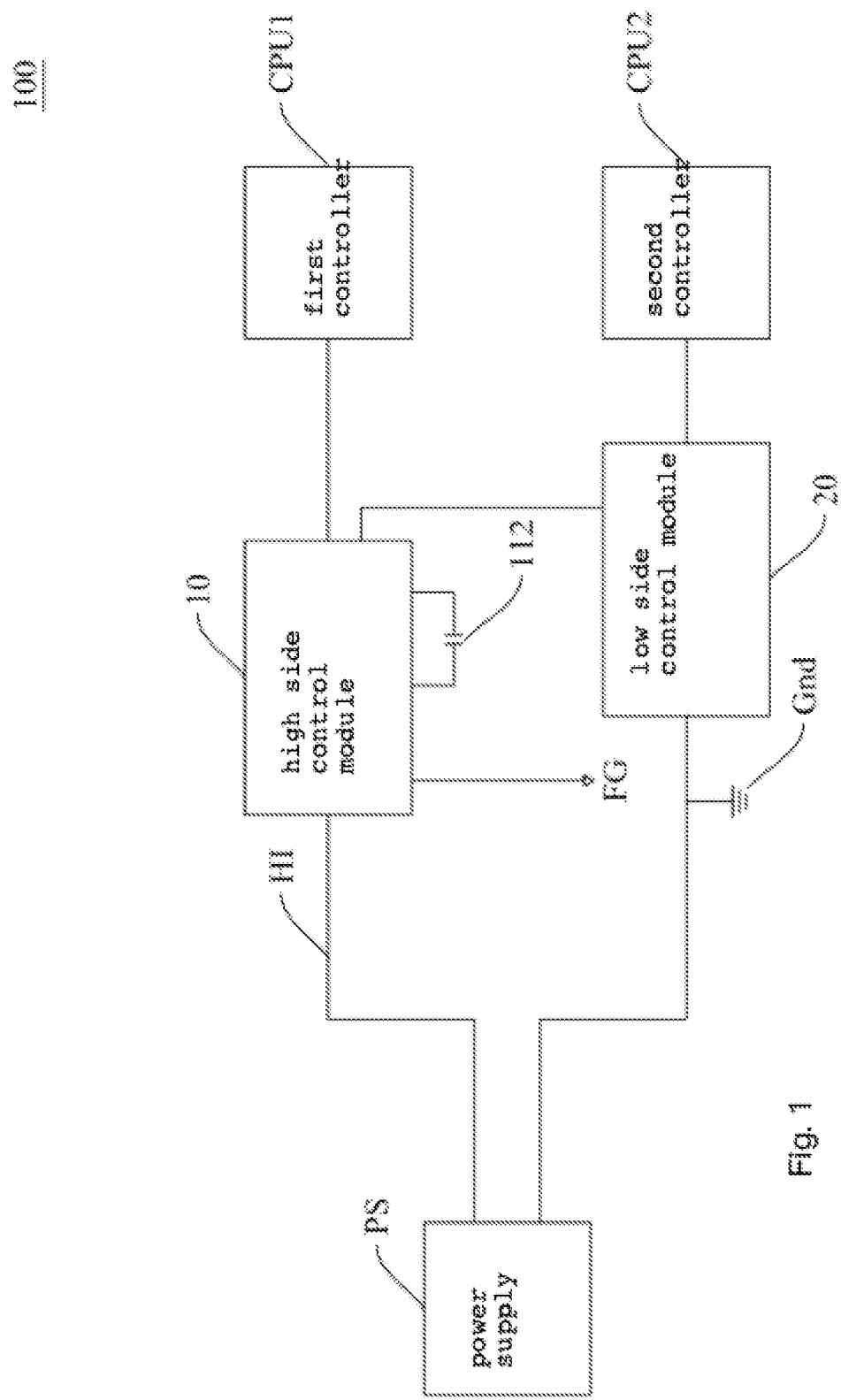
FIG. 1 illustrates a circuit diagram of a lighting apparatus embodiment.
Figure 2:
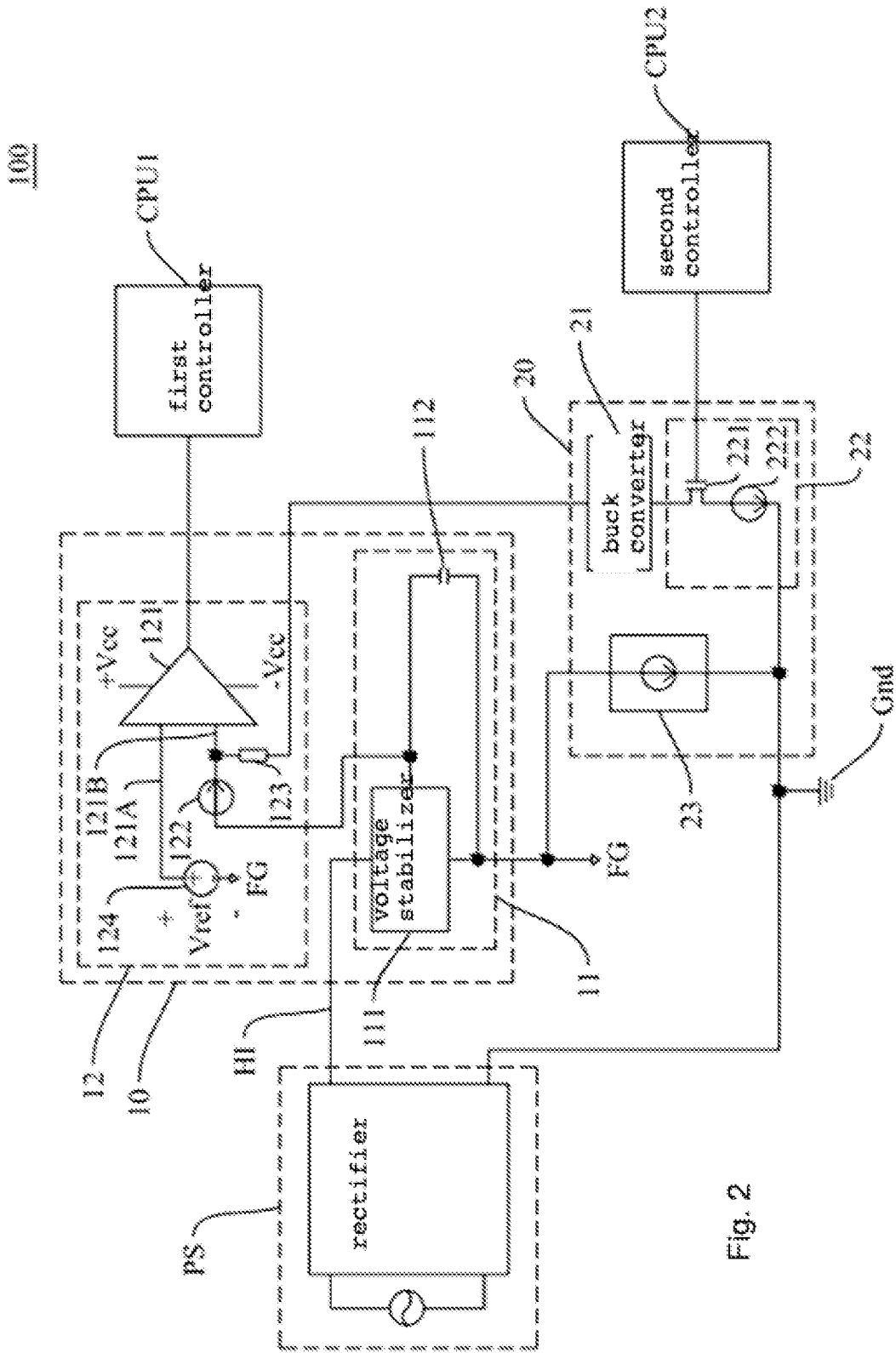
FIG. 2 illustrates a circuit example in an embodiment.

Please refer to FIG. 1 and FIG. 2, which show a system to drive high side circuit and low side circuit.

In FIG. 1 and FIG. 2, a driver system 100 is provided. The driver system 100 includes a high side control module 10 and a low side control module 20.

The high side control module 10 is disposed between a high side voltage input HI and a floating ground FG.

The low side control module 20 is disposed between the floating ground FG and the ground Gnd (low side voltage output).

In this embodiment, the high side control module 10 is connected to the high side voltage output of the power supply PS, but this is just an example, not to limit the scope of the present invention.

The high side control module 10 includes a voltage stabilizer 11 connected at the high side voltage input HI. The high side control module 10 also includes a current trigger 12 connected to the voltage stabilizer 11.

The output of the current trigger 12 is connected to a first controller CPU1 for outputting a first control signal to the first controller CPU1.

In some embodiments, the voltage stabilizer 11 includes a voltage stabilizer device 111 connected to the high side voltage input HI and a capacitor 112 connected to an output of the voltage stabilizer device 111.

In some embodiments, the voltage stabilizer device 111 may be a linear voltage stabilizer or a switch voltage stabilizer.

In some embodiments, the current trigger 12 includes a comparator 121 and a first current source 122. The input of the first current source 122 is connected to the voltage stabilizer 11 and the output of the first current source 122 is connected to the comparator 121. The current trigger 12 also includes a loading unit 123 series connected between the first current source 122 and the buck converter 21.

The first input 121A of the comparator 121 is connected between the output of the first current source 122 and the input of the loading unit 123. The second input 121B of the comparator 121 is connected to the reference voltage source 124.

One end of the reference voltage source 124 is connected to the floating ground FG to change the reference voltage according to the floating ground FG.

The low side control module 20 includes a buck converter 21 connected to the second input of the current trigger 12, includes a constant current trigger 22 series connected between the buck converter 21 and the ground Gnd, and includes a low side constant current source 23. The input of the low side constant current source 23 is connected to the voltage stabilizer 11 and the output of the low side constant current source 23 is connected to the ground Gnd.

The input of the constant current trigger 22 is connected to the second controller CPU2. The constant current trigger 22 is turned on or turned off according to an output signal of the second controller CPU2.

In some embodiments, the buck converter 21 includes at least one transistor switch between the current trigger 12 and the constant current trigger 22.

In some embodiments, the buck converter 21 may be a Buck Converter, a Low-DropOut regulator, LDO or other types.

In some embodiments, the constant current trigger 22 includes a switch controller 221 that turns on or turns off according to a first control signal CS1. The constant current trigger 22 also includes a second current source 222 series connected to the switch controller 221.

To control the node voltage of the first input 121A, the second current source 222 has a larger passing current than the passing current of the first current source 122.

When the switch controller 221 is turned on, the node voltage of the first input 121A of the comparator 121 is changed with the first current source 122 and the second current source 222 that are series connected. The second control signal CS2 is output to the first controller CPU1 by changing the node voltage to switch output of the comparator 121.

Figure 3:
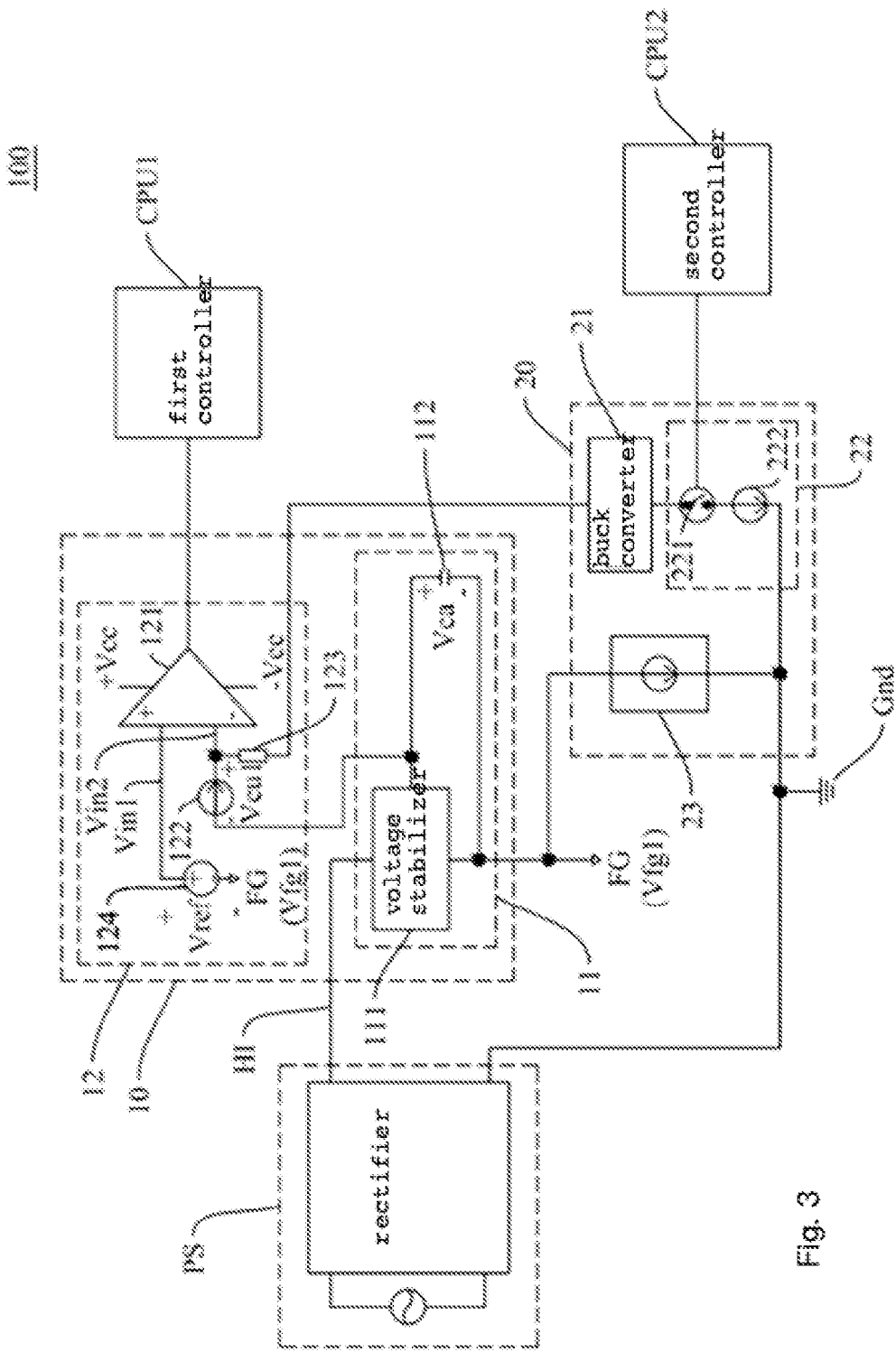
FIG. 3 illustrates another circuit example in an embodiment.
Figure 4:
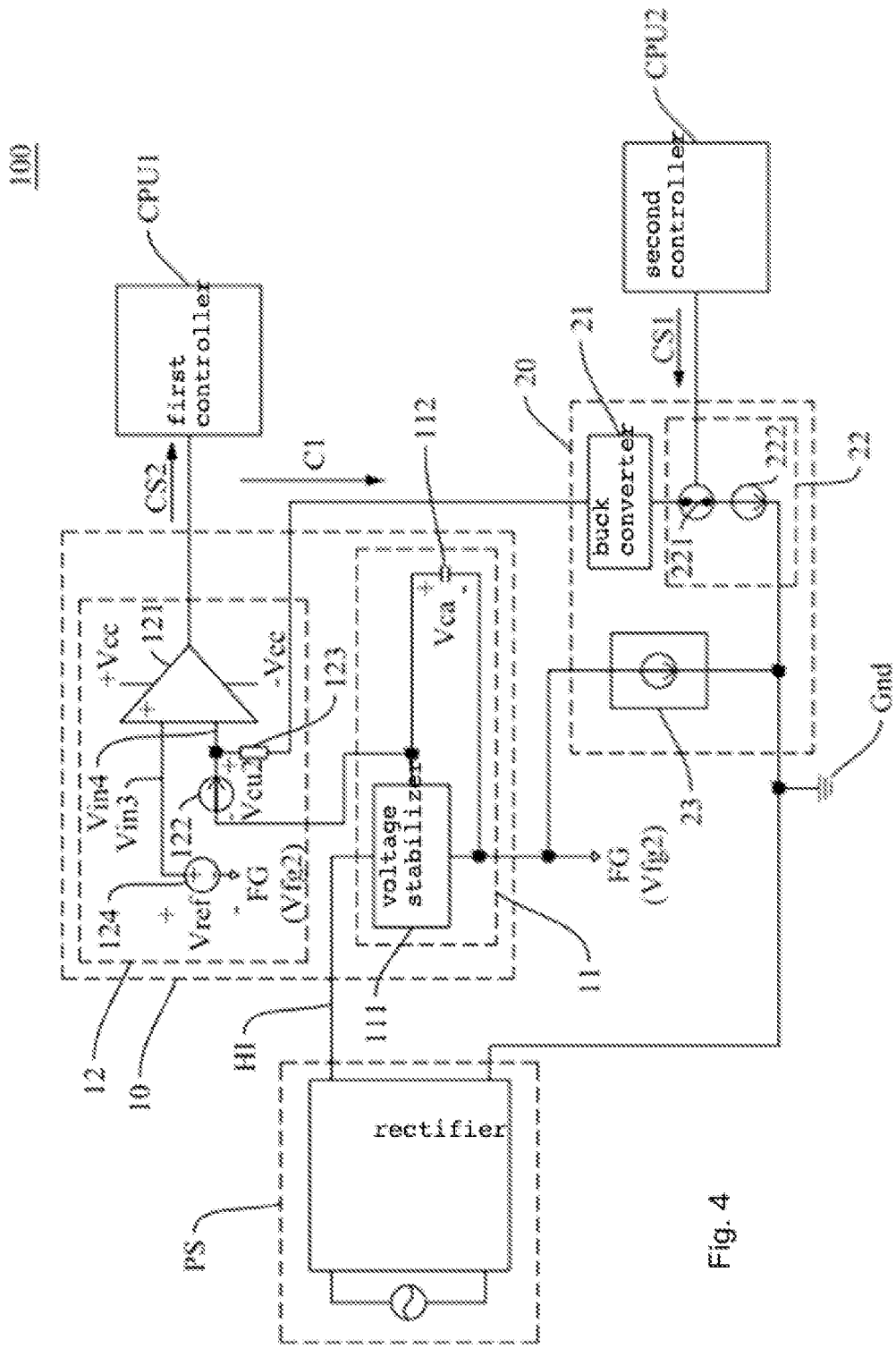
FIG. 4 illustrates another circuit example in an embodiment.

Please refer to FIG. 3 and FIG. 4, which show working status diagrams.

Please refer to FIG. 3, in a first status, e.g. a regular status, the constant current trigger 22 is turned off. The low side constant current source 23 charges the capacitor 112. The floating ground FG is adjusted to a voltage level Vfg1 in response to the low side constant current source 23.

In such case, the reference voltage source 124 of the current trigger 12 and the input of the low side constant current source 23 are both connected to the floating ground FG. Therefore, the reference voltage Vin1 is changed (Vin1=Vref+Vfg1) in response to the change of the floating ground FG.

By setting the capacitor 112 and the current source 122, the node reference Vin 2 is a sum of the capacitor 1112 (capacitor voltage Vca), current source 122 (current source voltage Vcu1) and the floating ground FG voltage (Vin2=Vca+Vcu1+Vfg1)

The first input 121A has a node voltage Vin2 that may be less than the reference voltage Vin 1. In such case, the current trigger 12 (comparator 121) output a first signal (e.g. 0 or 1).

Since the reference voltage source 124 of the current trigger 12 and the input of the low side current source 23 are connected to the floating ground FG, no matter how the floating ground FG changes its voltage, the reference voltage Vin1 and the node voltage Vin2 raise or lower down synchronously.

When the reference voltage Vref of the voltage source 124, the capacitor voltage Vca, and the voltage Vcu1 of the current source are under control, the sum of the capacitor voltage Vca and the voltage of the current source Vcu1 may be set less than the reference voltage Vref of the reference voltage source 124 to ensure the node voltage Vin2 is less than the reference voltage Vin1 in the first status.

Please refer to FIG. 4. In the second status, the constant current trigger 22 receives the first control signal CS1. The constant current trigger 22 is turned on and the second current source 222 is series connected to the first current source 122.

Since the second current source 222 is larger than the first current source 122, the constant current trigger 222 generates a pulling current C1 passing through the current trigger 12 to change the passing current of the first current source 122 so that to change the current source voltage Vcu1 to Vcu2 to change the reference voltage.

When the current trigger 12 determines that the comparing voltage is changed with respect to the reference voltage, a second signal is output. The second control signal CS2 is opposite to the first signal. For example, when the first signal is 0, the second signal is 1. When the first signal is 1, the second signal is 2.

Similarly, because the reference voltage 124 of the current trigger 12 and the input of the low side constant current source 23 are both connected to the floating ground FG, the reference voltage Vin3 is a sum of the reference voltage source 124 voltage Vref and the floating voltage level Vfg2 (Vin3=Vref+Vfg2).

The node voltage Vin4 (comparing voltage) is a sum of the capacitor voltage Vca and the floating voltage level Vfg2 (Vin4=Vca+Vcu2+Vfg2)

When the floating voltage level Vfg2 may be ignored, when the sum of the capacitor voltage Vca and the current source voltage Vcu2 is larger than the voltage Vref, the comparator 121 outputs the second control signal CS2.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
 a light source comprising a LED module;
 a driver circuit comprising a high side circuit and a low side circuit for generating a driving current to the LED module;
 a high side control module for controlling the high side circuit, wherein the high side control module comprises a voltage stabilizer and a current trigger, wherein the voltage stabilizer is placed on a voltage input of a high side, wherein the current trigger is connected to an output of the voltage stabilizer; and
 a low side control module for controlling the low side circuit, wherein the low side control module comprises a buck converter, a constant current trigger, and a low side constant current source, wherein the buck converter is connected to a second input of the current trigger, wherein the low side constant current source is series connected between the buck converter and a ground, wherein an input of the low side constant current source is connected to the voltage stabilizer, wherein an output of the low side constant current source is connected to the ground,
 wherein a reference voltage source of the current trigger and an input of the low side constant current source are both connected to a floating ground so that a reference voltage is changed when the floating ground is changed, wherein the constant current trigger changes a comparing voltage by generating a pulling current to the current trigger when the constant current trigger receives a first control signal, wherein the current trigger outputs a second control signal when the current trigger determines the comparing voltage changes with respect to the reference voltage.

2. The lighting apparatus of claim 1, wherein the voltage stabilizer comprises a voltage statblzier device connected to the input of high side voltage and a capacitor connected to an output of the voltage stablizer device.

3. The lighting apparatus of claim 2, wherein the voltage stablizer device is a linear voltage stabilizer.

4. The lighting apparatus of claim 2, wherein the voltage stabilizer device is a switch voltage stabilizer.

5. The lighting apparatus of claim 1, wherein the current trigger comprises a comparator, a first current source and a loading unit, wherein an input of the first current source is connected to the voltage stabilizer, wherein an output of first current source is connected to the comparator, wherein the loading unit is series connected between the first current source and the buck converter, wherein a first end of the comparator is connected between an output of the first current source and an input of the loading unit, wherein a second input of the comparator is connected to the reference voltage source, wherein an end of the reference voltage source is connected to the floating ground to change the reference voltage when the floating ground is changed.

6. The lighting apparatus of claim 5, wherein the constant current trigger comprises a switch controller to turn on or to turn off according to the first control signal, wherein the constant current trigger comprises a second current source series connected to the switch controller, wherein a passing current of the second current source is larger than a passing current of the first current source.

7. The lighting apparatus of claim 6, wherein when the switch controller is turned on, a node voltage of the first end of the comparator is changed by the first current source and the second current source.

8. The lighting apparatus of claim 7, wherein the node voltage is changed to switch the output of the comparator to output the second control signal.

9. The lighting apparatus of claim 1, wherein the buck converter comprises at least one transistor switch placed between the current trigger and the constant current trigger.

10. The lighting apparatus of claim 1, wherein the low side circuit is driven with the ground.

11. The lighting apparatus of claim 1, wherein the high side circuit needs a voltage raising to drive the high side circuit.

12. The lighting apparatus of claim 11, wherein a voltage of the low side circuit is transmitted to the high side circuit to control the high side circuit.

13. The lighting apparatus of claim 1, wherein an antenna is connected to the high side circuit.

14. The lighting apparatus of claim 13, wherein a wireless signal of the antenna is filtered with a filter.

15. The lighting apparatus of claim 14, wherein the wireless signal is descrambled before sent to the filter.

16. The lighting apparatus of claim 15, wherein the wireless signal is descrambled using a learning model.

17. The lighting apparatus of claim 16, wherein the learning model is a non-linear model.

18. The lighting apparatus of claim 16, wherein an error correction is performed in the learning model.

19. The lighting apparatus of claim 18, wherein the error correction is adjusted according to the reference voltage.

20. The lighting apparatus of claim 15, wherein if the descrambled result is lower than a threshold, the wireless signal is filtered directly.

* * * * *